US008803499B2

(12) United States Patent
Sreenivas et al.

(10) Patent No.: US 8,803,499 B2
(45) Date of Patent: Aug. 12, 2014

(54) POWER SUPPLY CIRCUITRY AND ADAPTIVE TRANSIENT CONTROL

(75) Inventors: Venkat Sreenivas, Winchester, MA (US); Robert T. Carroll, Andover, MA (US)

(73) Assignee: International Rectifier Corporation, El Segundo, CA (US)

( * ) Notice: Subject to any disclaimer, the term of this patent is extended or adjusted under 35 U.S.C. 154(b) by 603 days.

(21) Appl. No.: 13/087,188

(22) Filed: Apr. 14, 2011

(65) Prior Publication Data

US 2012/0212193 A1    Aug. 23, 2012

Related U.S. Application Data

(60) Provisional application No. 61/445,587, filed on Feb. 23, 2011.

(51) Int. Cl.
    G05F 1/575    (2006.01)
(52) U.S. Cl.
    USPC .......................... 323/284; 323/272; 323/285
(58) Field of Classification Search
    USPC .......................................... 323/272, 282–285
    See application file for complete search history.

(56) References Cited

U.S. PATENT DOCUMENTS

| | | | | |
|---|---|---|---|---|
| 5,568,044 A * | 10/1996 | Bittner | ........................... | 323/272 |
| 2005/0116698 A1* | 6/2005 | Prinz et al. | ..................... | 323/283 |
| 2007/0046273 A1* | 3/2007 | Riehl | .............................. | 323/282 |
| 2009/0174262 A1* | 7/2009 | Martin et al. | ................... | 307/82 |
| 2009/0322298 A1* | 12/2009 | Nishida | ......................... | 323/282 |
| 2010/0320983 A1* | 12/2010 | Wu | ................................ | 323/283 |
| 2011/0204988 A1* | 8/2011 | Prodic et al. | ................... | 332/110 |
| 2011/0210707 A1* | 9/2011 | Marsili et al. | .................. | 323/271 |
| 2012/0049908 A1* | 3/2012 | Karlsson et al. | .............. | 327/154 |
| 2012/0153919 A1* | 6/2012 | Garbossa et al. | ............. | 323/284 |

* cited by examiner

Primary Examiner — Adolf Berhane
Assistant Examiner — Fred E Finch, III
(74) Attorney, Agent, or Firm — Chapin IP Law, LLC

(57) ABSTRACT

A control circuitry can be configured to receive an error signal indicating a difference between an output voltage of the power supply and a desired setpoint for the output voltage. According to one configuration, depending on the error signal, the control circuitry initiates switching between operating the control circuitry in a pulse width modulation mode and operating the control circuitry in a pulse frequency modulation mode to produce an output voltage. Operation of the control circuitry in the pulse frequency modulation mode during a transient condition, such as when a dynamic load instantaneously requires a different amount of current, enables the power supply to satisfy current consumption by the dynamic load. Subsequent to the transient condition, the control circuitry switches back to operation in the pulse width modulation mode.

22 Claims, 12 Drawing Sheets

POWER SUPPLY CIRCUITRY AND ADAPTIVE TRANSIENT CONTROL

RELATED APPLICATIONS

This application is related to and claims the benefit of earlier filed U.S. Provisional Patent Application Ser. No. 61/445,857 entitled "ADAPTIVE CONTROL DURING A TRANSIENT," filed on Feb. 23, 2011, the entire teachings of which are incorporated herein by this reference.

BACKGROUND

A conventional voltage regulator module (e.g., a VRM) can be used to regulate a DC voltage supplied to a load, such as a microprocessor. A VRM can include a power converter, such as a DC-DC converter, and may include other components such as a control circuitry for controlling operation of the power converter.

An example of a DC-DC converter is a synchronous buck converter, which has minimal components, and therefore is widely used in VRM applications. In an example conventional application, the input voltage to the buck converter is typically $12V_{DC}$. An output voltage produced by the VRM may be $5.0V_{DC}$, $3.3 V_{DC}$, or lower.

Conventional multiphase interleaved VRM topologies can include two or more power converters that can be operated in parallel with each other to convert power and apply it to a corresponding load. In each of the power converters (or each power converter phase), the filter inductor can be smaller than that of an alternative, larger single-phase power converter design in order to achieve a faster dynamic response. The large output voltage ripple in each phase due to the small inductance can be cancelled by the ripple of other phases. Use of more phases in parallel reduces the ripple voltage. Implementation of a conventional multiphase voltage converter topology (as compared to a single voltage converter phase topology) can therefore enhance the output current capability of a power supply system.

A typical configuration of a conventional VRM such as a so-called synchronous buck converter includes one or more power converter phases. Each power converter phase can include an inductor, a high side switch, and a low side switch. A control circuitry associated with the buck converter repeatedly pulses the high side switch ON to convey power from a power source through the one or more inductors in the phases to a dynamic load. The control circuitry repeatedly pulses the low side switch ON to provide a low impedance path from a node of the inductor to ground in order to prevent an over-voltage condition on an output of the buck converter. Thus, the energy stored in the inductor increases during a time when the high side switch is ON and decreases during a time when the low side switch is ON. During switching operation, the inductor transfers energy from the input to the output of the converter.

Conventional PID control circuitry circuitry has been used to generate signals to control one or more power converter phases. In general, a conventional PID control circuitry typically includes three separate constant parameters including a proportional value (e.g., P-component), an integral value (e.g., an I-component), and a derivative value (e.g., a D-component). The P-component indicates a present error; the I-component is an accumulation of past errors, and the D-component is a prediction of future errors. A weighted sum of these three components can be used as input to control one or more phases in a power supply.

BRIEF DESCRIPTION

Conventional applications such as those as discussed above can suffer from a number of deficiencies. For example, conventional power supplies typically cannot provide a sufficiently fast response to large changes in current demand. For example, if a conventional power supply outputs 50 amperes of current to power a load, and the load instantaneously changes and only requires 2 amperes, the conventional power supply may inadvertently produce an output voltage having a magnitude outside a tolerable range. In such an instance, a device powered by the output voltage may be damaged. Conversely, if a conventional power supply outputs 2 amperes of current to power a load, and the load instantaneously requires 50 amperes, the conventional power supply may not be able to produce sufficient output current to prevent the output voltage from falling below or outside a tolerable range due to excessive current consumption. Accordingly, a device powered by the output voltage may turn OFF due to a droop in a magnitude of the output voltage.

Embodiments herein deviate with respect to conventional applications. For example, embodiments herein include novel power supply control circuitry to adjust control signals in a power supply during transient conditions in which a relatively fast change in current is needed to power a dynamic load.

More specifically, one embodiment herein includes control circuitry configured to receive an error voltage indicating a difference between an output voltage of the power supply and a desired setpoint for the output voltage. Depending on the error voltage, the control circuitry initiates switching between operating the control circuitry in a pulse width modulation mode and operating the control circuitry in a pulse frequency modulation mode to produce an output voltage to power a load. Operation of the control circuitry in the pulse frequency modulation mode during a transient condition, such as when a dynamic load instantaneously requires a different amount of current, enables the power supply to satisfy current consumption by the dynamic load. Subsequent to the transient condition, the control circuitry switches back to operation in the pulse width modulation mode.

In accordance with more specific embodiments, the control circuitry can be configured to analyze a magnitude and/or a slope of the error voltage to detect when a transient condition occured and thus determine whether to switch to the pulse frequency modulation mode. In one embodiment, a transient load condition is defined as a condition in which a magnitude of the error voltage falls outside an acceptable magnitude range and/or the slope of the error voltage falls outside of an acceptable slope range. A large change in magnitude or steep change in a slope of the error voltage can indicate a transient condition when a fast control response is needed to provide power to the load.

During a steady state, when a demand for current is relatively constant and there is no detection of a transient condition, the control circuitry implements a pulse width modulation mode to produce the output voltage. While in the pulse width modulation mode, the control circuitry produces a control signal to have a substantially fixed period and changes a width of the pulse to control the output voltage and maintain it within a desired range. A user can select the substantially fixed period for use in the pulse width modulation mode.

In one embodiment, during the pulse width modulation mode, the control circuitry utilizes a first circuit path of the control circuitry to adjust a pulse width of the control signal to control the output voltage. The first circuit path can include a P-component, I-component, and D-component of a conventional PID control circuitry circuit.

In response to detecting a transient condition such as when the dynamic load instantaneously requires more or less current, the control circuitry initiates switchover from the pulse width modulation mode to the pulse frequency modulation mode for at least a portion of the transient condition.

In one example embodiment, while in the pulse frequency modulation mode, the control circuitry utilizes the I-component in the first circuit path of the control circuitry to control a setting of the pulse width of the control signal but no longer uses the P-component and D-component of the first circuit path to control the pulse width value. Additionally, while in the pulse frequency modulation mode, the control circuitry utilizes a second circuit path of the control circuitry to adjust a period of the control signal. In one embodiment, the second circuit path adjusts a setting for the period based on a P-component and D-component disposed in the second circuit path.

Subsequent to detecting the transient condition and operating the control circuitry in the pulse frequency modulation mode to maintain a magnitude of the output voltage within a range during the transient condition, the control circuitry initiates switchover from the pulse frequency modulation mode back to the pulse width modulation mode to control the output voltage.

As will be discussed further below, the first circuit path (including a P-component, I-component, and D-component) can include one or more filters to minimize noise resulting in a delay when deriving respective pulse width setting information from the error voltage. During non-transient conditions, the delay caused by the first circuit path is not harmful since the output voltage generally does not change drastically while in the pulse width modulation mode.

In one embodiment, the second circuit path (supporting the pulse frequency modulation mode) does not include filters (e.g., one or more poles) as does the first circuit path. The second circuit path has a faster response than the first circuit because it does not include comparable filters as in the first circuit path. During a transient condition, it is desirable to quickly adjust control settings of one or more phase control signals to provide an appropriate change in current and magnitude of the output voltage.

One embodiment herein includes a control circuitry that utilizes a proportional, integral, derivative (PID) control circuitry that controls a duty cycle through pulse width modulation, adding or subtracting current from the inductors in response to load changes. As mentioned, the PID in the first circuit path is used during steady state (no load change) conditions. In parallel with the primary PID circuit (as used during non-transient conditions) is a secondary PD circuit according to embodiments herein. The PD control circuitry uses frequency modulation during the transient conditions to control the duty cycle in response to changes in load current.

As mentioned above, the P and D terms of the primary PID control circuitry are zeroed out (i.e., deactivated so that the P-component and D-component are each zero) when the transient PD circuit path is activated. This prevents the primary PID and secondary PD circuits from interacting in a negative manner. This configuration greatly simplifies tuning, as the two loops (e.g., first circuit path and second circuit path) can be tuned independently from one another. The I-term of the primary PID control circuitry can be kept active to serve as the reference point for the secondary PD control circuitry.

Embodiments herein can further include adding a shaping function following the secondary PD control circuitry. The shaping term can be a nonlinear term that acts to further increase speedups, improving control response. The shaping term can be disengaged when the slope measurement falls below a programmed threshold so that is only active for the initial response to a detected transient condition.

These and other more specific embodiments are disclosed in more detail below.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a multi-path control circuit configured to switch between operating in a pulse width modulation module and a pulse frequency modulation mode. A first circuit path of the multi-path control circuit supports the pulse width modulation mode; a second circuit path of the multi-path control circuit supports the pulse frequency modulation mode. When in the pulse width modulation mode, the control circuitry utilizes the first circuit path to adjust a pulse width setting for a pulsed control signal having a substantially fixed frequency. In the pulse frequency modulation mode, the control circuitry uses the second circuit path to adjust a period setting (e.g., frequency) for a pulsed control signal having a substantially fixed pulse width.

Figure 1:
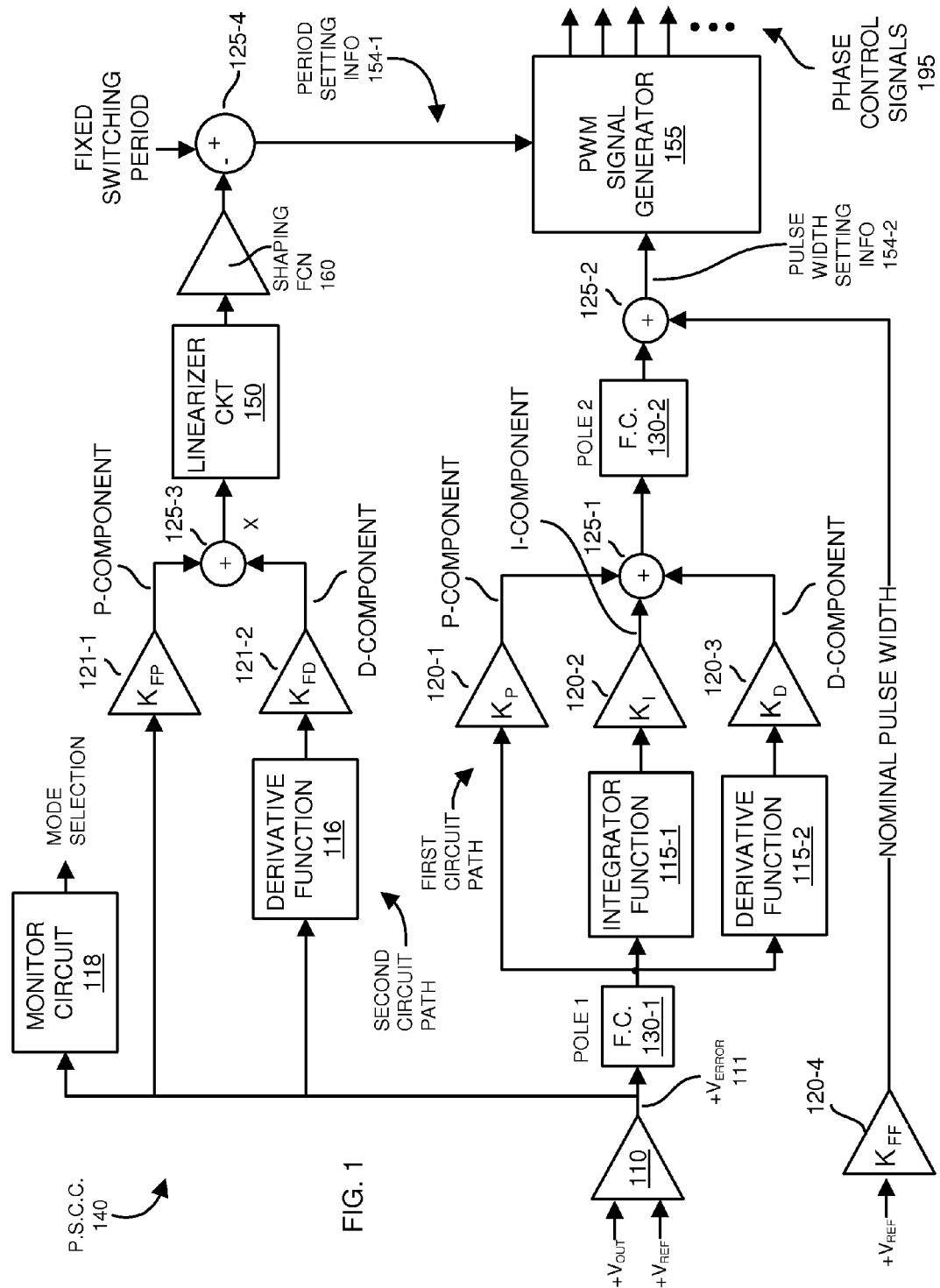
FIG. 1 is an example diagram of a power supply control circuitry according to embodiments herein.

More specifically, FIG. 1 is an example diagram of power supply control circuitry according to embodiments herein. During operation, the power supply control circuitry 140 generates one or more phase control signals 195 to control one or more respective power converter phases. The one or more power converter phases produce an output voltage, +Vout, that powers a respective load. This is more particularly shown and discussed in FIG. 9.

As shown in FIG. 1, power supply control circuitry 140 includes circuitry 110 such as an analog-to-digital converter device. Circuitry 110 produces an error signal 111 based on a difference between a desired output voltage setpoint, Vref, and the output voltage, +Vout, used to power a load.

Power supply control circuitry 140 includes monitor circuit 118. As its name suggests, the monitor circuit 118 monitors the error signal 111. By way of a non-limiting example, the monitor circuit 118 can monitor one or more attributes (e.g., magnitude, slope, etc.) of the error voltage to determine when the error signal 111 exceeds a threshold value.

In one example embodiment, The monitor circuit 118 defines a window around zero voltage error using 2 thresholds, fc_hth (e.g., a high threshold value) and fc_lth (e.g., a low threshold value). The monitor circuit defines a slope threshold (+ve or slope_hth for load release and −ve or slope_lth for load step up). When the slope of the error signal 111 is greater than the +ve slope threshold value, it is presumed that the load requires less current; when the slope of the error signal 111 is less than −ve, it is presumed that the load requires more current.

The monitor circuit also can define an overshoot error threshold voltage such as err_lth. In one embodiment, if the error signal 111 exceeds this threshold, all phase control signal are terminated to deactivate the power converter phases to prevent overshooting of the output voltage during a load release in which the load instantaneously consumes less current.

Based on the magnitude and/or slope of the error signal 111, the monitor circuit 118 selects one or more modes in which to operate the power supply control circuitry 140. For example, if the measured error signal 111 falls outside a range as specified by error window parameters for magnitude and/or slope, the monitor circuit 118 activates the pulse frequency modulation mode.

In accordance with one non-limiting example embodiment, the monitor circuit 118 switches between a first mode and second mode to generate the output voltage, Vout. For example, the monitor circuit 118 can select between operating the power supply control circuitry 140 in a pulse width modulation mode and a pulse frequency modulation mode.

Figure 2:
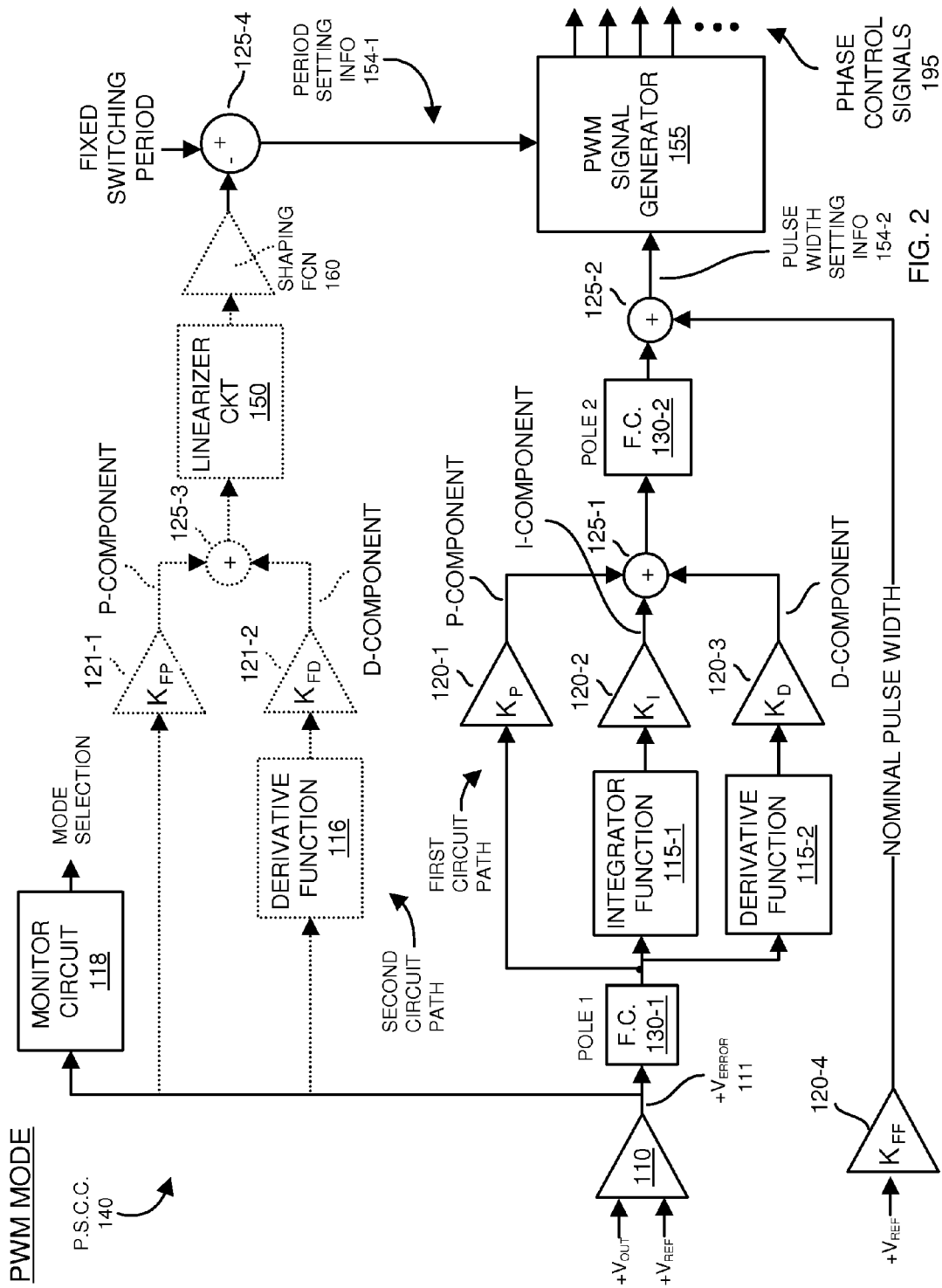
FIG. 2 is an example diagram of a power supply control circuitry operating in a first mode according to embodiments herein.

FIG. 2 is an example diagram illustrating operation of the power supply control circuitry in the pulse width modulation mode according to embodiments herein. In general, the circuitry in the second circuit path of power supply control circuitry 140 is deactivated while in the pulse width modulation mode. The circuitry outlined by dotted lines indicates circuitry that is deactivated during the pulse width modulation mode. When in the pulse width modulation mode, the power supply control circuitry 140 utilizes the components in the first circuit path to control a pulse width setting of control signals generated by the pulse width modulation signal generator 155.

For example, circuitry 110 produces error signal 111. Error signal 111 is fed into a filter circuit 130-1 such as a low pass filter having one or more poles. As such, filter circuit 130-1 imparts a delay in downstream transmission of the error voltage 110 to the PID circuitry. The first circuit path can include appropriate PID coefficients (e.g., Kp, Ki, and Kd, etc.) and low pass filter settings to ensure stable operation.

The filtered error voltage produced by the filter circuit 130-1 is fed into a PID circuitry including a configuration of integrator function 115-1, integrator function 115-2, gain stage 120-1 (e.g., Kp), gain stage 120-2 (e.g., Ki), gain stage 120-3 (e.g., Kd) as shown.

The PID control circuitry produces three components, namely, P-component, I-component, and D-component. Any suitable K values and poles can be selected for circuitry in the first circuit path.

Function 125-1 receives the P-component, I-component, and D-component in the first circuit path and produces a summation of each of the PID components.

The sum of the PID components is fed into filter circuit 130-2. Filter circuit 130-2 also can be configured to include one or more poles. Filter circuit 130-2 imparts or incurs an additional delay in transmitting the summation of the PID components to the summer 125-2.

Function 125-2 sums the filtered summation of the PID components and a nominal pulse width value produced by gain stage 120-4 to produce pulse width setting information 154-2. The pulse width modulation generator circuit 155 receives the pulse width setting information 154-2 from function 125-2.

As its name suggests, the pulse width setting information 154-2 indicates how to control a setting of one or more pulse widths in respective phase control signal 195 generated by pulse width modulation signal generator 155.

When in the pulse width modulation mode, the PWM signal generator 155 also receives period setting information 154-1 from function 125-4. Because the second circuit path in power supply control circuitry 140 is deactivated, the period setting information 154-1 is set to a substantially fixed value (e.g., the inputted fixed switching period inputted to the function 125-4). In one embodiment, a user selects a setting of the fixed switching period inputted to the function 125-4.

Thus, when the power supply control circuitry 140 is set to the pulse width modulation mode, the period setting information 154-1 indicates a substantially fixed frequency in which to generate the phase control signals 195. To maintain the output voltage within an acceptable range, the PWM signal generator 155 generally varies a pulse width of the phase control signals 195 based on the pulse width setting information 154-2.

It should be noted that when operating the first circuit path in the control circuitry 140 to generate the pulse width setting information 154-2, the filter circuitry (e.g., filter circuit 130-1 and filter circuit 130-2) imparts a certain amount of delay between receiving the error signal 111 and producing corresponding pulse width setting information 154-2 to adjust for any changes in the output voltage, Vout, due to an increase or decrease in current consumption by a respective dynamic load.

The power supply control circuitry 140 operates in the pulse width modulation mode until detection of a transient condition by the monitor circuit 118. As previously discussed, a transient condition can be flagged by the monitor circuit 118 depending on one or more monitored parameters. For example, in accordance with one embodiment, a transient condition can be flagged when the magnitude (e.g., absolute value of magnitude) is above a magnitude threshold value and/or when the slope of the error voltage (e.g., an absolute value of the slope) is above a slope threshold value.

In response to detecting a transient condition or step condition such as when the load requires more or less current in a relatively short amount of time, the control circuitry 140 switches to the pulse frequency modulation mode.

Figure 3:
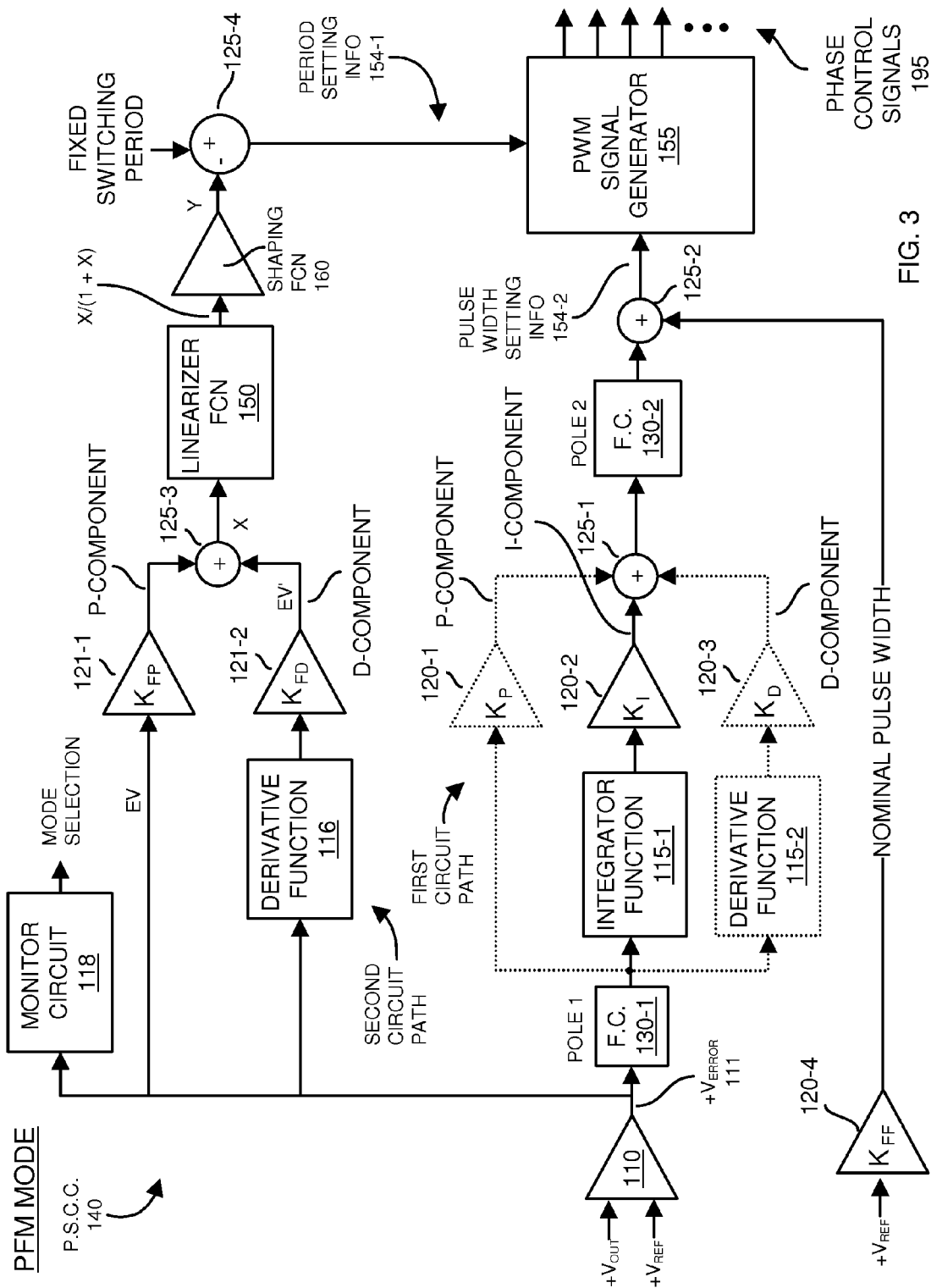
FIG. 3 is an example diagram of a power supply control circuitry operating in a second mode according to embodiments herein.

FIG. 3 is an example diagram illustrating operation of the power supply control circuitry in the pulse frequency modulation according to embodiments herein.

In general, in the pulse frequency modulation mode, a portion of the circuitry in the first circuit path is deactivated and the circuitry in the second circuit path is activated to produce the output voltage. The circuitry outlined by dotted lines in the first circuit path indicates circuitry that is deactivated during the pulse frequency modulation. The other circuitry is activated during the activated during the pulse frequency modulation mode.

For example, when switching to the pulse frequency modulation mode, the control circuitry 140 activates and utilizes only the I-component in the first circuit path of the control loop to control a pulse width of one or more control signal generated by the PWM signal generator 155 of the control circuitry 140. The control circuitry 140 discontinues use of the P-component and D-component in the first circuit path to generate the pulse width setting information 154-2 (as was done in the pulse width modulation mode). The control circuitry 140 utilizes a P-component and D-component in the second circuit path of the control loop in conjunction with the I-component in the first circuit path of the control loop to operate in the pulse frequency modulation mode.

The second circuit path controls a period of the phase control signal to produce the output voltage. Changing the period of the phase control signal 195 causes the frequency of the phase control signals 195 to change.

Thus, in the pulse frequency modulation mode, the control circuitry 140 operates the first circuit path to control the pulse width setting of the phase control signal; the control circuitry 140 operates the second circuit path to control the switching period of the phase control signal. In one embodiment, while in the pulse frequency modulation mode, the pulse width setting may be substantially fixed or change slowly over time.

As previously discussed, circuitry 110 produces error signal 111. Error signal 111 is fed into filter circuit 130-1 such as a low pass filter having one or more poles. As such, filter circuit 130-1 imparts a delay in transmission of the error signal 111 downstream in the first circuit path. The filtered error signal produced by the filter circuit 130-1 is fed into an integrator function 115-1. As mentioned and as noted by dotted lines, the P-component and D-component of the PID control circuitry in the first circuit path is deactivated during the pulse frequency modulation mode.

Function 125-1 is activated and passes the I-component to the filter circuit 130-2. As previously discussed, filter circuit 130-2 can be configured to include one or more poles. Filter circuit 130-2 imparts an additional delay in transmitting the I-component to the function 125-2.

Function 125-2 sums the I-component and a nominal pulse width value produced by gain stage 120-4 to produce pulse width setting information 154-2. The pulse width modulation generator circuit 155 receives the pulse width setting information 154-2 from function 125-2. As its name suggests, the pulse width setting information 154-2 indicates how to control a setting of one or more pulse widths in respective phase control signal 195 generated by pulse width modulation signal generator 155.

As mentioned, while in the pulse frequency modulation mode, the pulse width setting information 154-2 may be a substantially fixed value. In other words, the I-component may not change much during a transient condition.

When in the pulse frequency modulation mode, the PWM signal generator 155 receives period setting information 154-1 produced by function 125-4. The period setting information 154-1 is a measurement of a difference between the fixed switching period and an output of the second circuit path.

In general, while in the pulse frequency modulation mode, changes in the period setting information 154-1 maintain the output voltage within an acceptable range. That is, the PWM signal generator 155 varies a pulse period or frequency of the phase control signals 195 to maintain the output voltage within an acceptable range. In this mode, the pulse width may be adjusted as well to maintain the output voltage within the acceptable range.

As previously discussed, the filter circuits 130 in the first circuit path delay generation of the pulse width setting information 154-2. As shown, in one embodiment, the second circuit path does not include filters as does the first circuit path. Accordingly, the second circuit path provides a faster control response than does the first circuit path, especially for P-component and D-component in the second path as compared to the P-component and D-component in the first circuit path.

The filtered path (e.g., the first circuit path) including filter circuitry 130 can cause an appreciable delay. The non-filtered path (e.g., second path) of the control loop implemented in the pulse frequency modulation mode can be configured to incur a delay that this much smaller than the delay caused by the filter circuits in the first path. In one embodiment, the signal delay caused In other words, the control circuitry 140 can be configured such that a delay between receiving the error voltage in the second circuit path and generating corresponding period setting information 154-1 can be less than half or substantially smaller than the delay or amount of time between receiving the error voltage in the first circuit path and generating corresponding pulse width setting information 154-2. Again, the second circuit path lacks a duplication of the filter circuitry (e.g., one or more poles found in the first path) in order to provide a substantially faster control response than the first circuit path.

While in the pulse frequency modulation mode, the control circuitry 140 reduces an amount of time between high side switch activation pulses to increase an amount of current to a load; the control circuitry 140 increases an amount of time between high side switch activation pulses to decrease an amount of current to the load.

In one embodiment, the output, x, of the function 125-3 in the second circuit path is as follows:

x=Kfp*EV+Kfd*d(EV)/dt, where EV is the error signal 111 and d(EV)/dt is slope of the error signal or derivative of the error signal 111. As it's name suggests, linearizer circuit 150 is configured to linearize the input, x, received from the function 125-3.

When the PID compensator circuit changes the duty cycle of the one or more phase control signal 195 by changing pulse width, keeping switching frequency constant, the system becomes substantially linear. For example, (W+d)/T=W/T (1+d/W), where d=delta pulse width, W=pulse width setpoint, T=period. The multiplier is of the form (1+x). This is linear.

But changing duty cycle by changing switching frequency is inherently non-linear. For example, W/(T−d)=W/T (1/(1−d/T)). The multiplier is of the form 1/(1−x). This is non linear.

To linearize this change in switching frequency, embodiments herein include digitally converting the calculated x to a value of y=x/(1+x). This is because 1/(1−y)=1/(1−(x/1+x)) =1+x.

After linearizing the input x using linearizer function 150, the control circuitry 140 inputs the linearized value produced by the linearizer circuit 150 into shaping function 160.

In accordance with further embodiments, the shaping function 160 is a non-linear term to alter a duty cycle by changing the switching frequency. This shaping function 160 is only non-linear when the slope of the error signal is greater than a slope threshold value. The shaping function 160 (e.g., an S value>=1) multiplies the "linearized" x/(1+x) value outputted by the linearizer circuit 150 to produce y=S*x/(1+x). Note that more details of S are discussed in FIG. 7.

The overall value is 1/(1−y)=1/(1−(S*x/1+x))=1+x/(1−x (S−1)). For values of S that are greater than 1, this function is non linear (super linear).

Together, these features (e.g., linearizer circuit 150 and shaping function 160) work to improve the VR's response to load transients.

Figure 4:
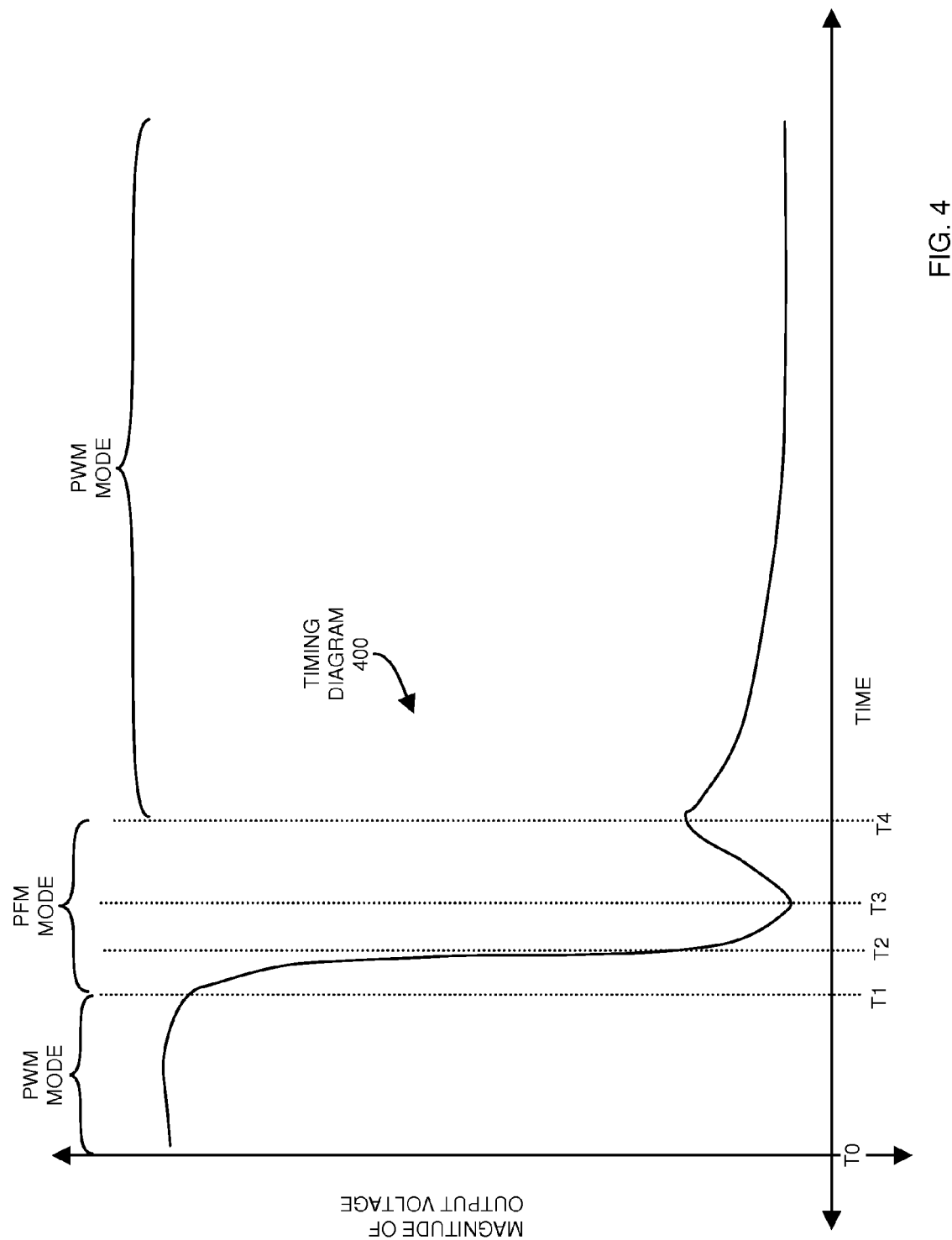
FIG. 4 is an example theoretical timing diagram illustrating a change in output voltage due to an increase in current consumption by a load according to embodiments herein.

FIG. 4 is an example theoretical timing diagram illustrating a change in output voltage due to an increase in current consumption by a load according to embodiments herein.

As shown, between time T0 and time T1, the control circuitry 140 operates in the pulse width modulation mode.

At time T1, as a result of increased current consumption by a load, the monitor circuit 118 of control circuitry 140 detects that an absolute value of the magnitude and/or absolute value of the slope of the error signal 111 is above a threshold value. In response to detecting this transient condition at time T1, the control circuitry 140 initiates switch over to the pulse frequency modulation mode. The PWM signal generator 170 speeds up generation of pulses to account for the drop in output voltage.

At time T1, the shaping function 160 is activated to implement the non-linear S gain to the second circuit path. The non-linear response or gain in the pulse frequency modulation mode between time T1 and T2 provides a faster response when it is most needed to account for a change in the load.

Figure 7:
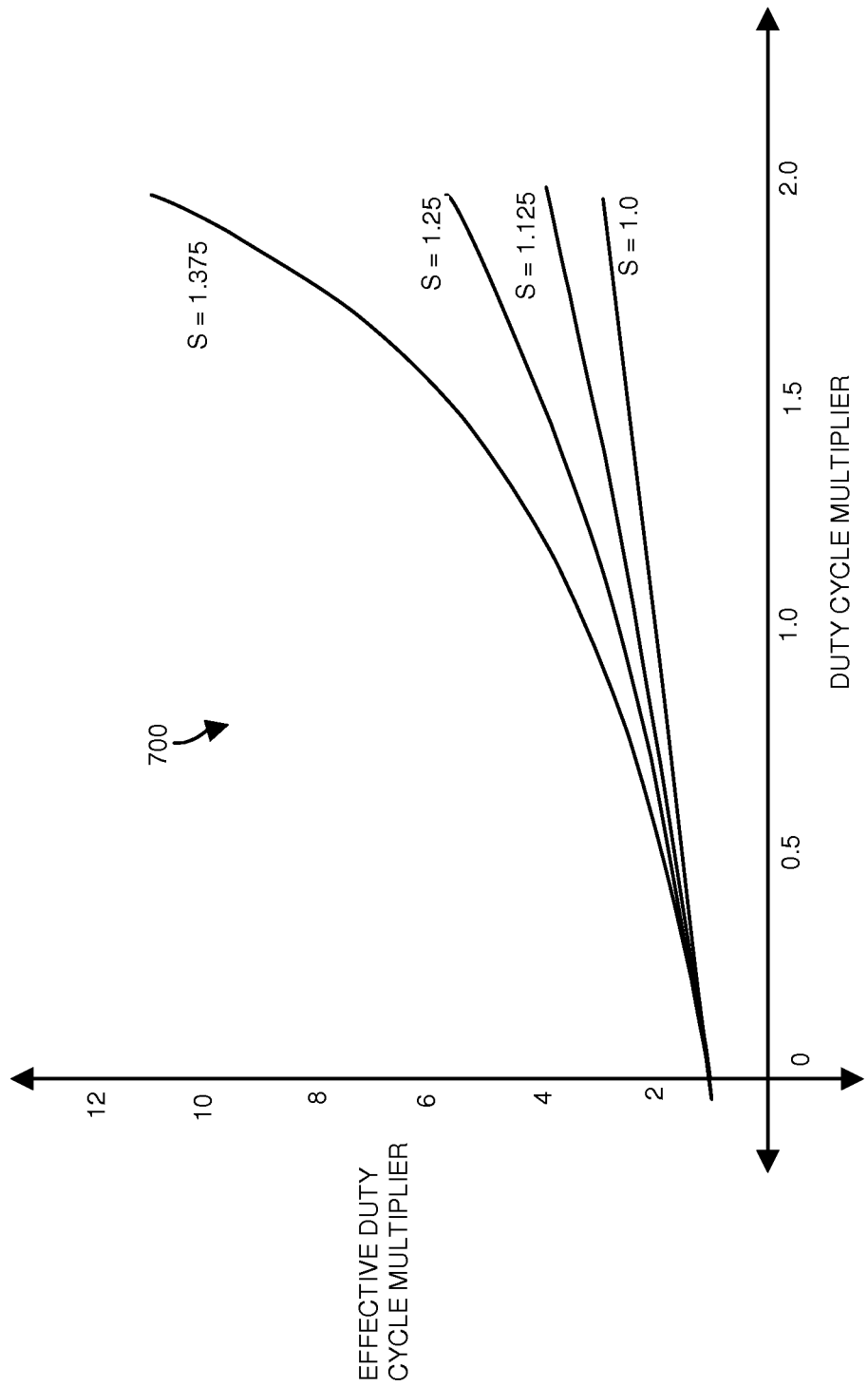
FIG. 7 is an example diagram illustrating different effective duty cycle multipliers shaping functions according to embodiments herein.

At time T2, when the slope of the error signal 111 is no longer above a slope threshold value, the shaping function 160 discontinues implementing the non-linear S gain in the second circuit path. Subsequent to time T2, the non-linear gain is deactivated and the shaping function 160 is set to provide a linear gain of 1. Note that FIG. 7 is a diagram illustrating the different S-gain curves for configuring the shaping function 160 between time T1 and T2. The shaping function is set to a gain of 1 when the slope of the error signal 111 falls below a slope threshold value.

Referring again to FIG. 4, at time T3, the slope of the error signal 111 goes to zero. This is the point where the contribution from the D-component in the second circuit path goes to zero. Subsequent to time T3, this D-component can be negative.

At time T4, the error signal 111 is zero or is negative and the monitor circuit 118 initiates switch over from the pulse frequency modulation mode back to the pulse width modulation mode.

Figure 5:
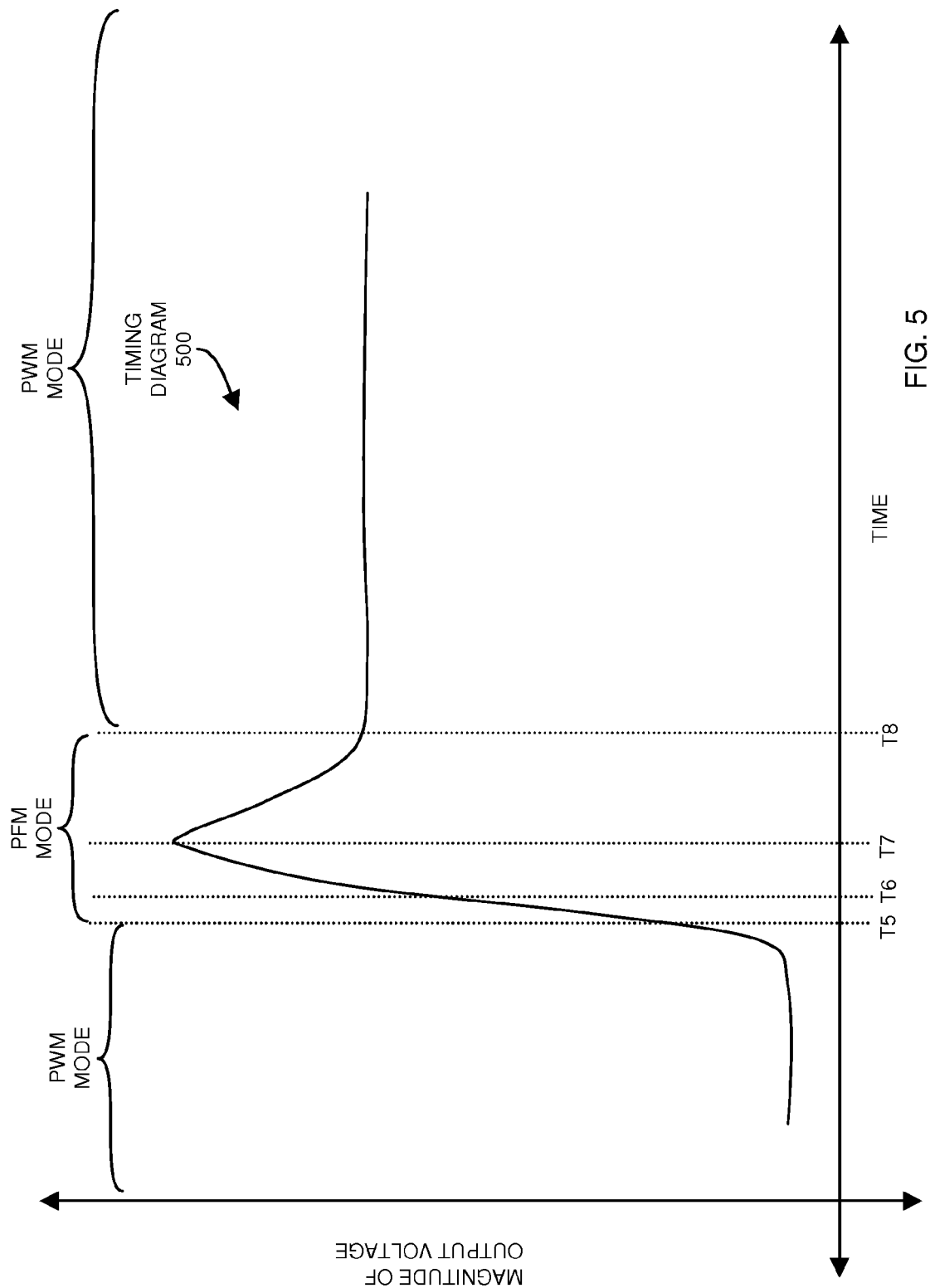
FIG. 5 is an example theoretical timing diagram illustrating a change in output voltage due to a decrease in current consumption by a load according to embodiments herein.

FIG. 5 is an example theoretical timing diagram illustrating a change in output voltage due to a decrease in current consumption by a load according to embodiments herein.

Prior to time T5, the monitor circuit 118 sets the control circuitry 140 to operate in the pulse width modulation mode.

At time T5, the monitor circuit 118 detects that a magnitude of the error signal 111 is greater than a threshold value and that the slope of the error signal 111 is greater than a slope threshold value. As mentioned, this corresponds to a transient condition. In response to the transient condition, the monitor circuit 118 initiates switch over from the pulse width modulation mode to the pulse frequency modulation mode.

At time T6, the monitor circuit detects that a magnitude of the error voltage is greater than a respective threshold value. To prevent an overshoot in a magnitude of the output voltage, the monitor circuit 118 initiates deactivation of one or more power converter phases. If there is no threat of an overshoot, the monitor circuit 118 initiates operation of the control circuitry 140 in the pulse frequency modulation mode.

At time T7, the slope of the error signal 111 is approximately zero. The contribution of the D-component in the second circuit path is approximately zero at this time and can be positive thereafter.

At time T8, the monitor circuit 118 detects that the error signal 111 goes to zero or is positive. In response to detecting this condition, the monitor circuit 118 initiates switch over from the pulse frequency modulation mode to the pulse width modulation mode.

Figure 6:
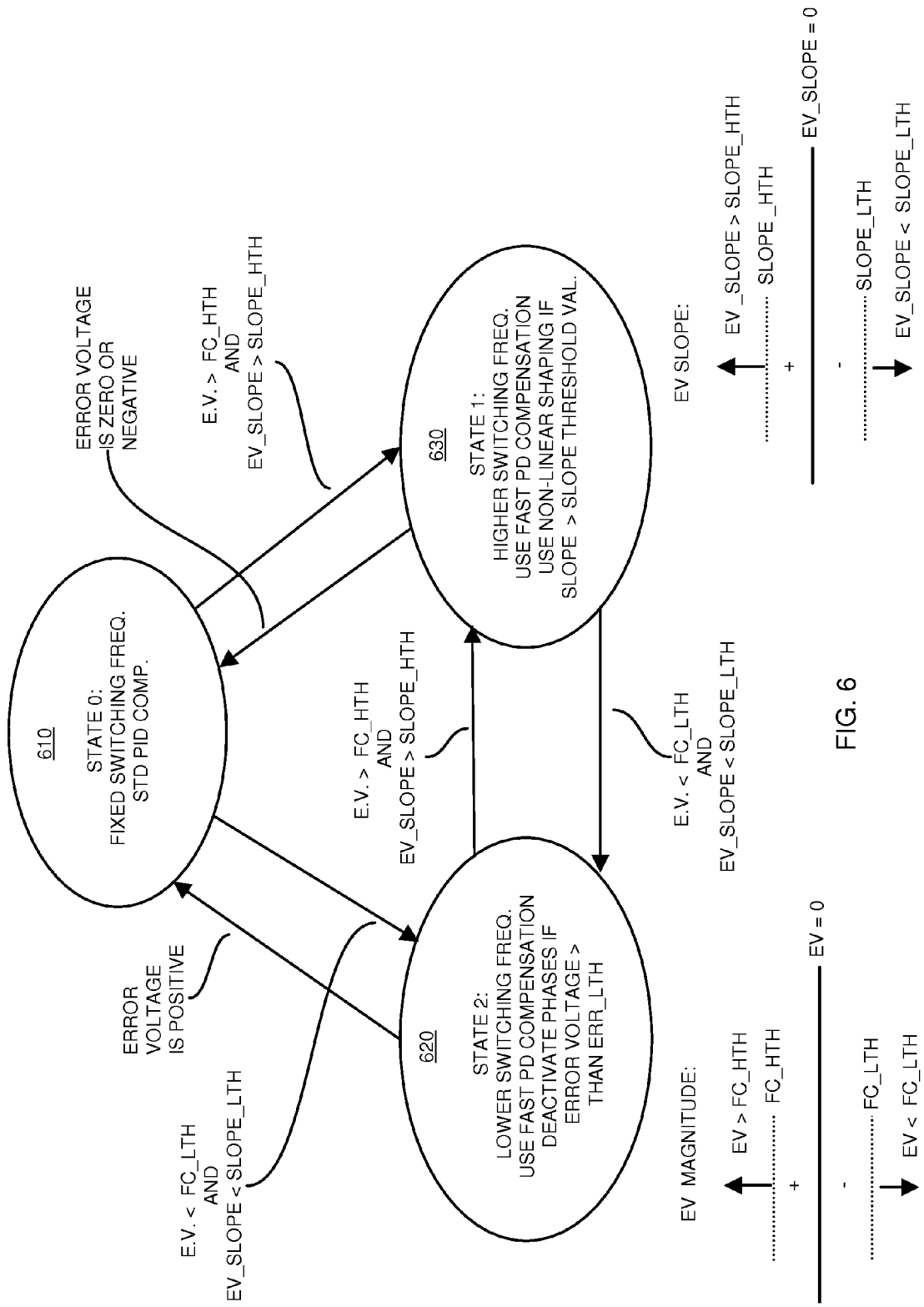
FIG. 6 is an example state diagram illustrating switching between a pulse width modulation mode and a pulse frequency modulation according to embodiments herein.

FIG. 6 is an example state diagram illustrating switching between a pulse width modulation mode and a pulse frequency modulation mode according to embodiments herein.

State 610 indicates operation of the control circuitry 140 in the pulse width modulation mode as discussed herein. Detection of a transient condition such as a lower demand for current (e.g., a load step down), the monitor circuit 118 initiates switch over from operating in state 610 to operating in state 620. In one embodiment, the monitor circuit 118 initiates switch over from state 610 to state 620 in response to detecting that the error signal 111 is less than a low_magnitude threshold value (e.g., FC_LTH) and the slope of the error signal 111 is less than a low_slope threshold value (e.g., SLOPE_LTH).

State 620 includes operating the control circuitry 140 in the pulse frequency modulation mode and lowering the switching frequency of the phase control signals 195. As mentioned, the monitor circuit 118 can initiate deactivation of power converter phases if the error signal 111 magnitude is greater than an overshoot threshold value to prevent an overshoot on the output voltage. The monitor circuit 118 initiates switch over to state 610 if the error voltage becomes positive. In one embodiment, the monitor circuit 118 initiates switch over to state 630 in response to detecting that the error signal 111 is greater than a high_magnitude threshold value (e.g., FC_HTH) and the slope of the error signal 111 is greater than a high_slope threshold value (e.g., SLOPE_HTH).

State 630 includes operating the control circuitry 140 in the pulse frequency modulation mode and increasing the switching frequency of the phase control signals 195. The monitor circuit 118 initiates switch over to state 610 if the error voltage becomes zero or negative. The monitor circuit 118 initiates switch over to state 620 if the error signal 111 is less than low threshold value and slope of the error voltage is less than a slope threshold value. In one embodiment, the monitor circuit 118 initiates switch over from state 630 to state 620 in response to detecting that the error signal 111 is less than a low_magnitude threshold value (e.g., FC_LTH) and the slope of the error signal 111 is less than a low_slope threshold value (e.g., SLOPE_LTH).

FIG. 7 is an example diagram illustrating different effective duty cycle multipliers according to embodiments herein. As previously discussed, the shaping function 160 can be configured to provide any of the gain curves between time T5 and T6.

Figure 8:
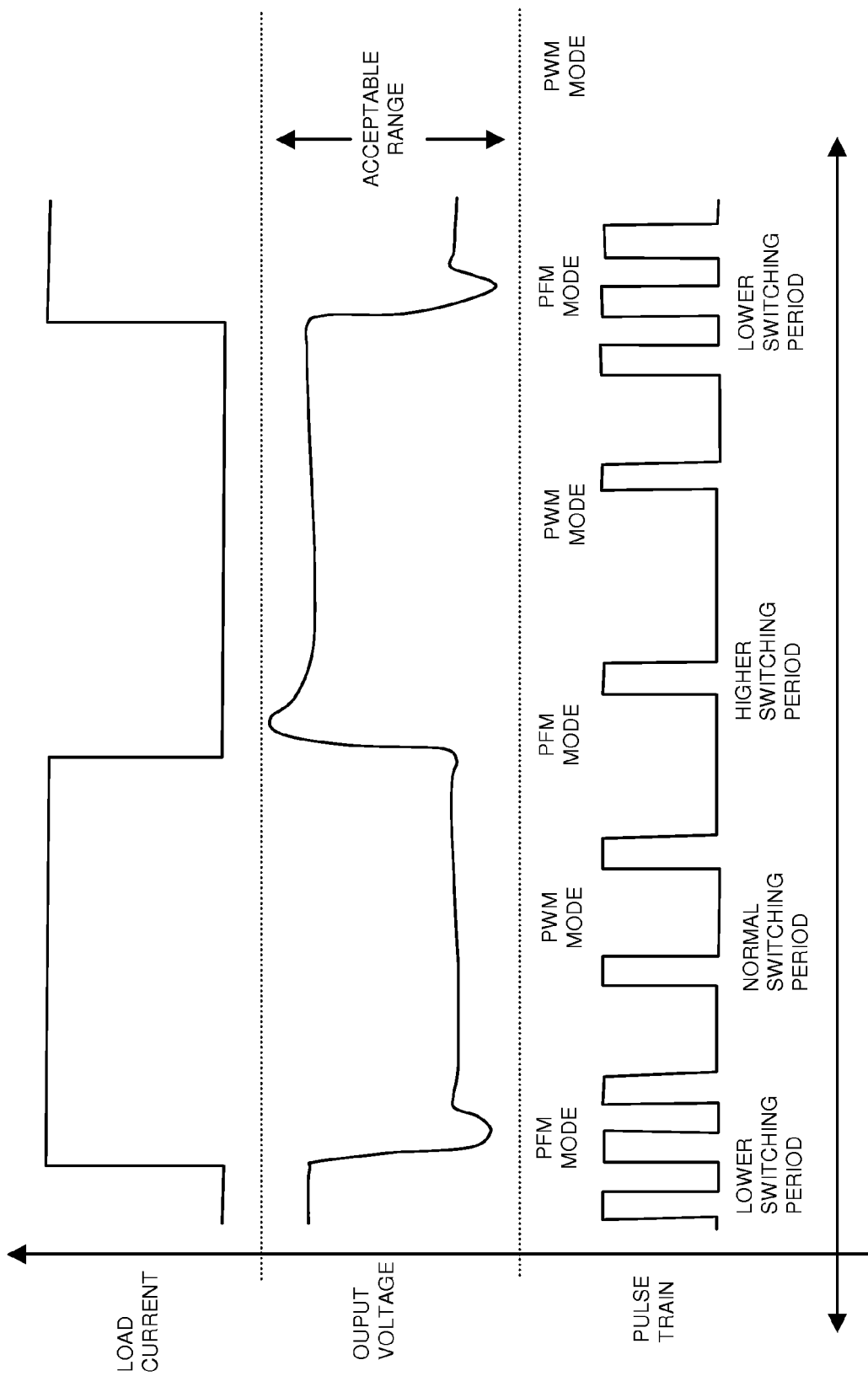
FIG. 8 is an example theoretical timing diagram of control pulses generated by a control circuitry to maintain the output voltage within an acceptable range during steady state and transient conditions according to embodiments herein.

FIG. 8 is an example timing diagram of control pulses generated by a control circuitry to maintain the output voltage within an acceptable range during steady state and transient conditions according to embodiments herein.

As shown, the control circuitry 140 operations in different modes to keep a magnitude of the output voltage, Vout, within an acceptable range. The logic highs states in the pulse train indicate activation of high side switch circuitry in one or more power converter phases to prevent the output voltage from falling below a threshold value during an increase in current consumption by the load.

Figure 9:
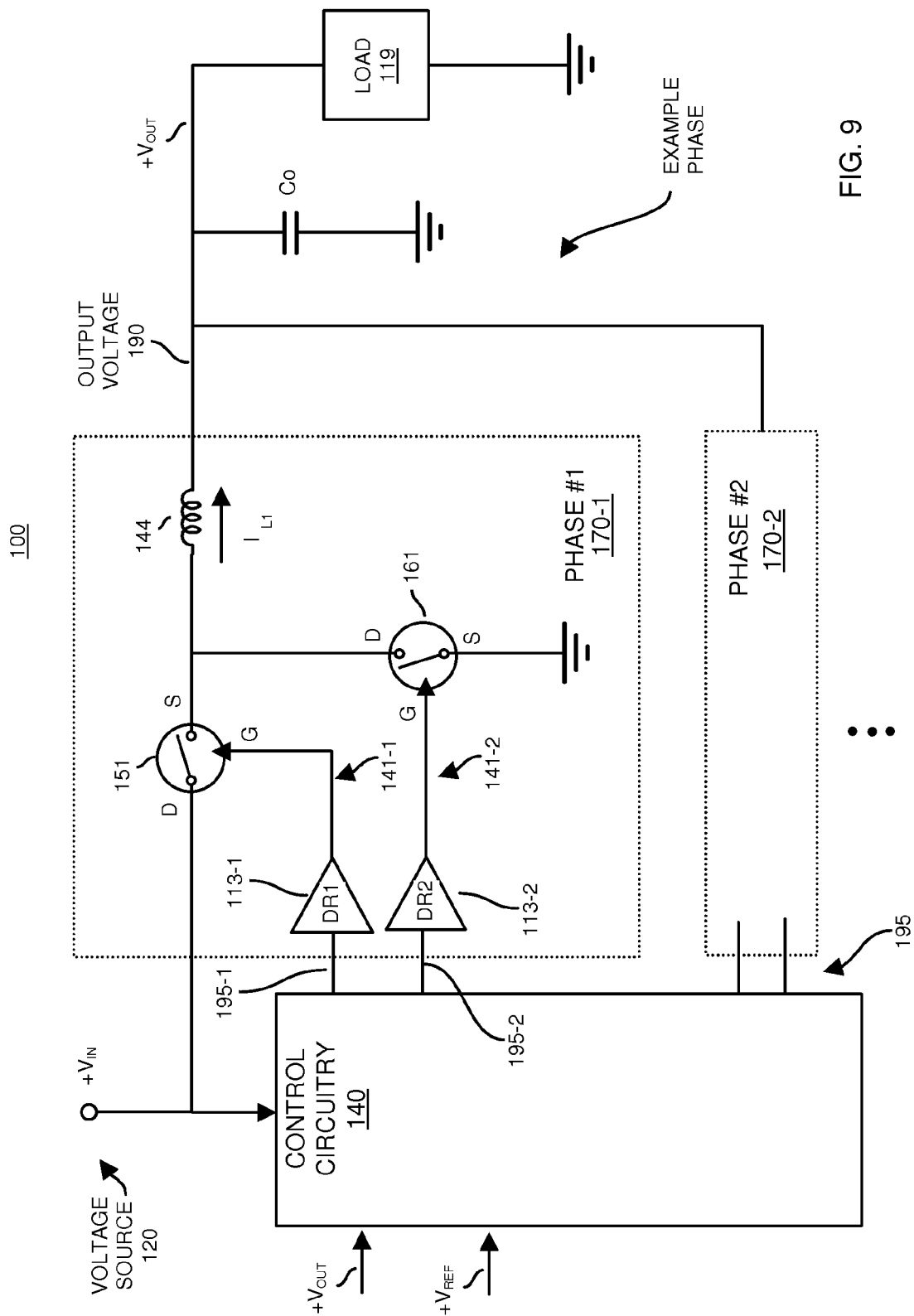
FIG. 9 is an example diagram illustrating a power supply circuit including control circuitry to drive one or more power converter phases according to embodiments herein.

FIG. 9 is an example diagram illustrating a power supply circuit driving one or more power converter phases according to embodiments herein. As shown, the power supply 100 includes control circuitry 140. Control circuitry 140 controls an operation of power supply 100 and produces output voltage 190 (i.e., +Vout) based at least in part on +Vref as mentioned.

More specifically, according to one embodiment, control circuitry 140 receives inputs or feedback such as Vin, Vout, Vref, current provided by each active phase, etc.

Based on operating conditions of power supply 100, the control circuitry 140 activates one or more power converter phases (e.g., phase #1, phase #2, etc.) to produce output voltage 190.

Based on the received inputs and configuration settings of control circuitry 100, control circuitry 100 outputs control signals to switch the high side switch 151 and low side switch 161 ON and OFF when a first phase such as phase 170-1 is activated. Switching operation of high side switch 151 and low side switch 161 produces output voltage 190 to power load 119.

In one embodiment, the control circuitry 140 generates phase control signal 195-1 and phase control signal 195-2 to control the driver circuits 113-1 and 113-2 as shown. Based on control signals received from the control circuitry 140, driver 113-1 controls a state of high side switch 151 (e.g., a control switch) and driver 113-2 controls a state of low side switch 161 (e.g., a synchronous switch) in power supply 100.

Note that driver circuits 113 (e.g., driver circuit 113-1 and driver circuit 113-2) can be located in the control circuitry 140 or can reside at a remote location with respect to the content 140.

When high side switch 151 is turned ON (i.e., activated) via control signals generated by control circuitry 140 (while the low side 161 or synchronous switch is OFF), the current through inductor 144 increases via a highly conductive electrical path provided by high side switch 151 between voltage source 120 and inductor 144.

When low side switch 161 is turned ON (i.e., activated) via control signals generated by control circuitry 140 (while the high side switch 151 or control switch is OFF), the current through inductor 144 decreases based on an electrically conductive electrical path provided by the low side switch 161 between the inductor 144 and ground as shown.

Based on proper switching of the high side switch 151 and the low side switch 161, the control circuitry 140 regulates the output voltage 190 within a desired range to power load 119.

In one embodiment, power supply 100 includes multiple phases as shown. Each of the multiple phases can be similar to the example phase 170-1 shown in FIG. 1. During heavier load 119 conditions, the control circuitry 140 initiates activation of multiple phases. For example, during lighter load 119 conditions, the control circuitry 140 activates fewer phases such as a single phase. The control circuitry 140 activates the one or more phases to maintain the output voltage 190 within a desired range to power load 119.

As shown, each phase can include a respective high side switch circuit and low side switch circuit as previously discussed. To deactivate a respective phase, the phase control circuitry 140 can set both high side switch circuitry and low side switch circuitry of the respective phase to an OFF state. When off or deactivated, the respective phase does not contribute to producing current to power the load 119.

The control circuitry 140 can select how many phases to activate depending on an amount of current consumed by the load 119. For example, when the load 119 consumes a relatively large amount of current, the control circuitry 140 can activate multiple phases to power the load 119. When the load 119 consumes a relatively small amount of current, the control circuitry 140 can activate fewer or a single phase to power the load 119.

The phases can be operated out of phase with respect to each other.

Any of multiple different types of methods such as estimations or physical measurements can be implemented in the power supply 100 to detect an amount of current provided by each of the phases or an overall amount of current consumed by the load 119. Such information may be useful in determining how phases should be activated to produce the output voltage 190.

The control circuitry 140 can also monitor other parameters such as a rate of change in a magnitude of the output voltage 190 to determine how many phases will be used to produce the output voltage 190.

Note that the control circuitry 140 include or be a computer, processor, micro-control circuitry, digital signal processor, etc., configured to carry out and/or support any or all of the method operations disclosed herein. In other words, the control circuitry 140 can include one or more computerized devices, processors, digital signal processor, computer readable storage medium, etc. to operate as explained herein to carry out different embodiments of the invention.

Note that embodiments herein such as control circuitry 140 can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic (e.g., software, firmware, instructions, . . . ) encoded thereon that, when performed in the control circuitry 140 having a processor and corresponding storage, programs the control circuitry 140 to digitally perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the control circuitry 140 to cause the control circuitry 140 to perform the techniques explained herein.

Figure 10:
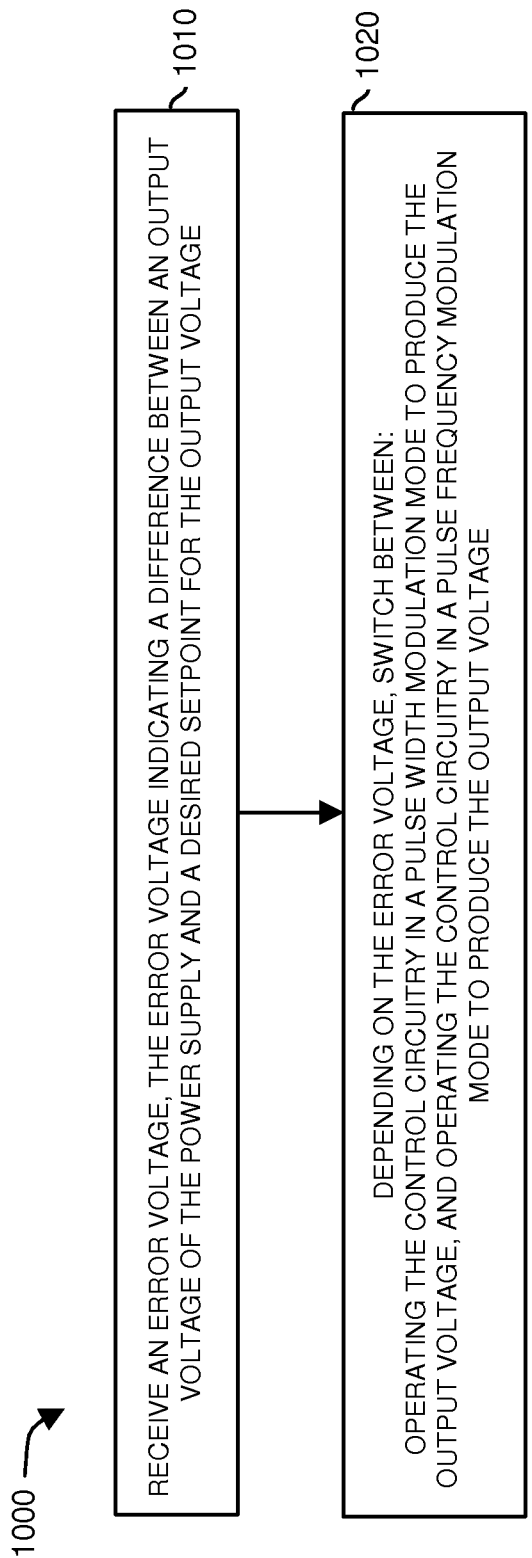
FIG. 10 is a flowchart illustrating an example method according to embodiments herein.

FIG. 10 is a flowchart 1000 illustrating an example method of controlling operation of a power supply according to embodiments herein. Note that there will be some overlap with respect to concepts as discussed above. Also, the steps can be executed in any suitable order.

In step 1010, the control circuitry 140 receives an error signal 111. The error signal 111 indicates a difference between an output voltage, Vout, of the power supply 100 and a desired setpoint Vref for the output voltage.

In step 1020, depending on the error signal 111, the monitor circuit 118 of control circuitry 140 switches between: operating the control circuitry 140 in a pulse width modulation mode to produce the output voltage, and operating the control circuitry 140 in a pulse frequency modulation mode to produce the output voltage.

Figure 11:
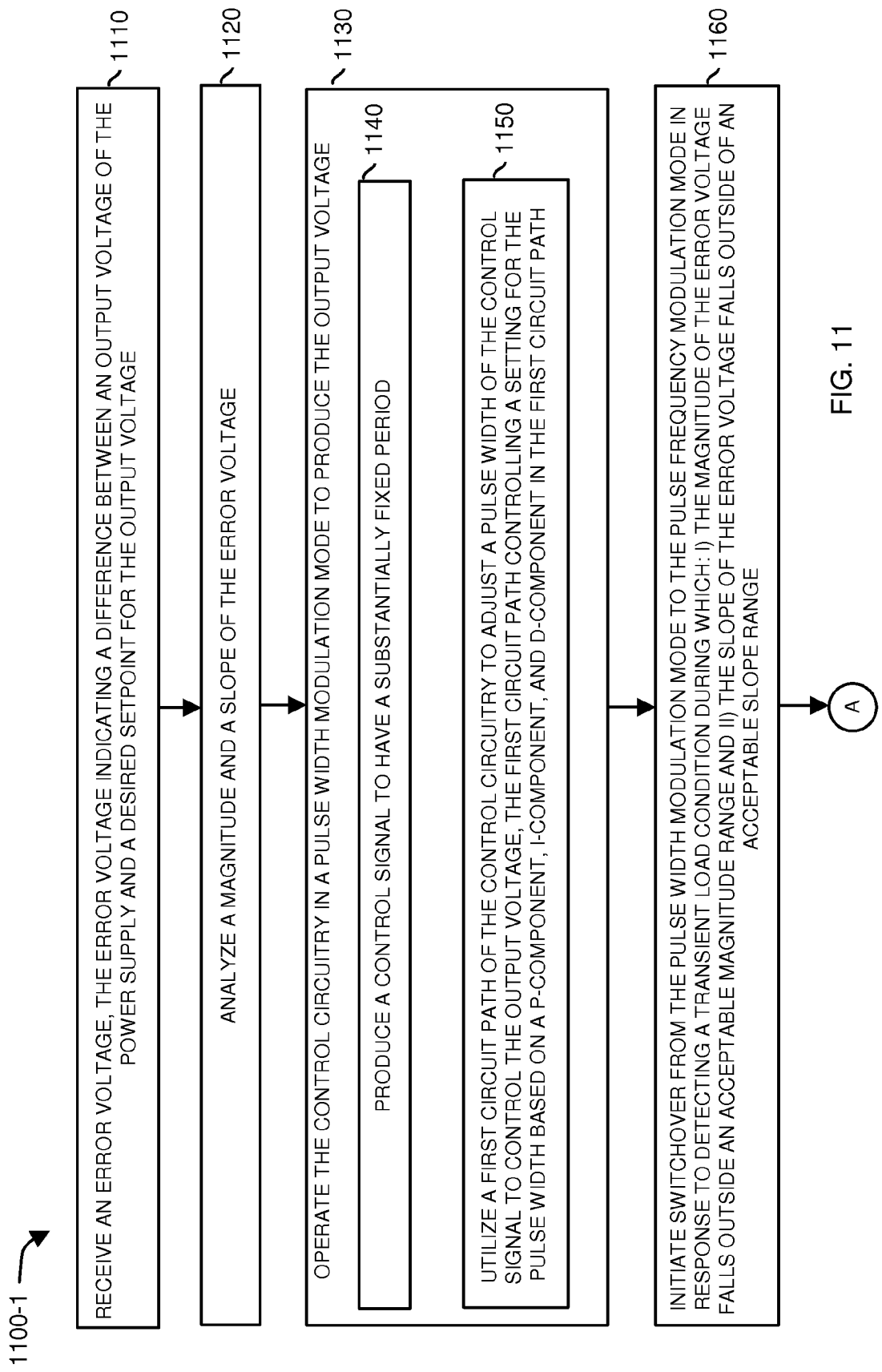
FIGS. 11 and 12 combine to form a detailed flowchart illustrating an example method according to embodiments herein.
Figure 12:
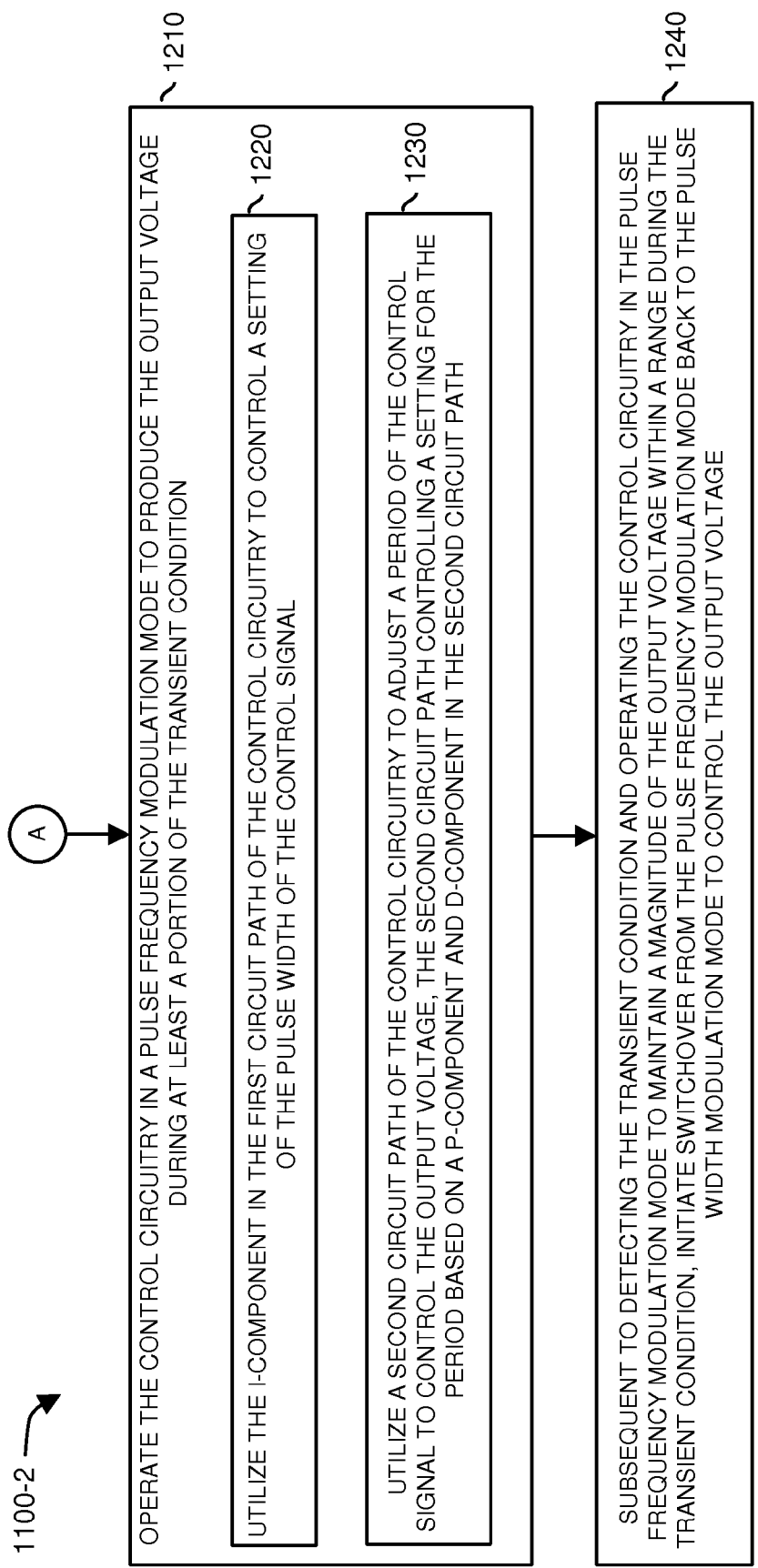

FIGS. 11 and 12 combine to form flowchart 1100 (e.g., flowchart 1100-1 and flowchart 1100-2) illustrating a detailed example method of operating a power supply according to embodiments herein. Note that there will be some overlap with respect to concepts as discussed above. The steps below can be executed in any suitable order.

In step 1110 of flowchart 1100-1, the control circuitry 140 receives error signal 111. The error signal 111 indicates a difference between an output voltage of the power supply 100 and a desired setpoint for the output voltage.

In step 1120, the monitor circuit 118 of control circuitry 140 analyzes a magnitude and/or a slope of the error signal 111.

In step 1130, the monitor circuit 118 operates the control circuitry 140 in a pulse width modulation mode to produce the output voltage.

In sub-step 1140, the control circuitry 140 produces at least one of control signals 195 to have a substantially fixed period.

In sub-step 1150, the control circuitry 140 utilizes a first circuit path to adjust a pulse width of the control signal to control the output voltage. The first circuit path controls a setting for the pulse width based on a P-component, I-component, and D-component in the first circuit path.

In step 1160, the monitor circuit 118 initiates switchover from the pulse width modulation mode to the pulse frequency modulation mode in response to detecting a transient load condition during which: i) the magnitude of the error signal 111 falls outside an acceptable magnitude range and ii) the slope of the error signal 111 falls outside of an acceptable slope range.

In step 1210, the monitor circuit 118 operates the control circuitry 140 in a pulse frequency modulation mode to produce the output voltage during at least a portion of the transient condition.

In sub-step 1220, the control circuitry 140 utilizes the I-component in the first circuit path of the control circuitry 140 to control a setting of the pulse width of the control signal.

In sub-step 1230, the control circuitry 140 utilizes a second circuit path of the control circuitry to adjust a period of the control signal to control the output voltage, the second circuit path controlling a setting for the period based on a P-component and D-component in the second circuit path.

In step 1240, subsequent to detecting the transient condition and operating the control circuitry 140 in the pulse frequency modulation mode to maintain a magnitude of the output voltage within a range during the transient condition, the control circuitry 140 initiates switchover from the pulse frequency modulation mode back to the pulse width modulation mode to control the output voltage.

Note again that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or a non-transitory computer readable media) including computer program logic encoded thereon that, when performed in a computerized device having a processor and corresponding storage, programs the processor to perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the control circuitry 140 to cause the control circuitry 140 to perform the techniques explained herein.

Accordingly, one particular embodiment of the present disclosure is directed to a computer program product that includes a non-transitory computer readable hardware storage medium (e.g., memory, storage repository, optical disk, integrated circuit, etc.). In other words, the control circuitry 140 as discussed herein can include a computer readable hardware medium for storing the current estimation and mode control algorithm. Such an algorithm supports operations such as power supply switching control functions as discussed herein. For example, in one embodiment, the instructions, when carried out by a control circuitry 140 cause the control circuitry 140 to perform operations as in the flowcharts below.

Techniques herein are well suited for use in power supply applications. However, it should be noted that embodiments herein are not limited to use in such applications and that the techniques discussed herein are well suited for use in other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of

We claim:

1. A method comprising:
   via control circuitry in a power supply:
      receiving an error signal, the error signal indicating a difference between an output voltage of the power supply and a desired setpoint for the output voltage; and
      depending on the error signal, switching between:
         operating the control circuitry in a pulse width modulation mode to produce the output voltage, and
         operating the control circuitry in a pulse frequency modulation mode to produce the output voltage;
   the method further comprising:
      monitoring the error signal to detect a transient condition;
      prior to initiating switchover from the pulse width modulation mode to the pulse frequency modulation mode in response to the transient condition, utilizing a P-component, an I-component, and a D-component in a first circuit path in the control circuitry to operate in the pulse width modulation mode;
      in response to detecting the transient condition: i) utilizing the I-component in the first circuit path of a control loop to control a pulse width of a control signal generated by the control circuitry, ii) discontinuing use of the P-component and D-component in the first circuit path to control the pulse width, and iii) utilizing a P-component and D-component in a second circuit path of the control loop in conjunction with the I-component in the first circuit path of the control loop to operate in the pulse frequency modulation mode.

2. The method as in claim 1, wherein operating the control circuitry in the pulse width modulation mode includes: in response to detecting that an absolute value of a slope of the error signal is below a threshold voltage value, adjusting a pulse width of a phase control signal having a substantially fixed period to control at least one phase of the power supply to produce the output voltage; and
   wherein operating the control circuitry in the pulse frequency modulation mode includes: in response to detecting that the absolute value of the slope of the error signal is above the threshold voltage value, adjusting a period of a phase control signal having a substantially fixed pulse width to control the at least one phase of the power supply to produce the output voltage.

3. The method as in claim 1, wherein operating the control circuitry in the pulse width modulation mode to produce the output voltage includes implementing the first circuit path to control the pulse width of the control signal to produce the output voltage; and
   wherein operating the control circuitry in the pulse frequency modulation mode to produce the output voltage includes implementing the second circuit path to control a period setting of the phase control signal to produce the output voltage.

4. The method as in claim 3 further comprising:
   operating the first circuit path to generate the pulse width setting based on the error signal, the first circuit path including filter circuitry delaying generation of the pulse width setting; and
   operating the second circuit path to generate the period setting from the error signal, the second circuit path lacking filter circuitry to provide a substantially faster response than the first circuit path.

5. The method as in claim 1 further comprising:
   in response to detecting the transient condition based on a change in the error signal, switching from operating the control circuitry in the pulse width modulation mode to the pulse frequency modulation mode;
   implementing a signal shaping function in the pulse frequency modulation mode to provide a non-linear control response to the transient condition until a slope of the error signal reduces to a value below a threshold value; and
   subsequent to providing the non-linear control, implementing the signal shaping function in the pulse frequency modulation mode to provide a linear control response.

6. The method as in claim 1 further comprising:
   analyzing a magnitude and a slope of the error signal; and
   initiating switchover from the pulse width modulation mode to the pulse frequency modulation mode in response to detecting the transient load condition during which: i) the magnitude of the error signal falls outside an acceptable magnitude range and ii) the slope of the error signal falls outside of an acceptable slope range.

7. The method as in claim 6 further comprising:
   subsequent to detecting the transient condition and operating the control circuitry in the pulse frequency modulation mode to maintain a magnitude of the output voltage within a range during the transient condition, initiating switchover from the pulse frequency modulation mode back to the pulse width modulation mode to control the output voltage.

8. The method as in claim 1, wherein operating the control circuitry in the pulse width modulation mode to produce the output voltage includes operating the first circuit path to control the pulse width of the control signal to produce the output voltage while a switching period of the control signal is a substantially fixed value; and
   wherein operating the control circuitry in the pulse frequency modulation mode to produce the output voltage includes:
      operating the first circuit path to control the pulse width setting of the phase control signal, and
      operating the second circuit path to control the switching period of the phase control signal.

9. The method as in claim 1 further comprising:
   in response to detecting that a magnitude of the error signal is above a threshold value, initiating deactivation of at least one phase in the power supply to prevent an overshoot on the output voltage.

10. The method as in claim 1 further comprising:
    in response to detecting the transient condition based on a change in the error signal, switching from operating the control circuitry in the pulse width modulation mode to the pulse frequency modulation mode; and
    providing a non-linear control response to the transient condition until a slope of the error signal decreases below a threshold value.

11. The method as in claim 1 further comprising:
    switching from operating the control circuitry in the pulse width modulation mode to operating the control circuitry in the pulse frequency modulation mode in response to detecting that a magnitude of the error signal is above a threshold value.

12. The method as in claim 1 further comprising:
    switching from operating the control circuitry in the pulse width modulation mode to operating the control circuitry in the pulse frequency modulation mode in response to detecting that a magnitude of the error signal is below a first threshold value; and switching from operating the control circuitry in the pulse frequency modulation mode to operating the control circuitry in the pulse width modulation mode in response to detecting that the magnitude of the error signal is greater than a second threshold value.

13. The method as in claim 1 further comprising:

switching from operating the control circuitry in the pulse width modulation mode to operating the control circuitry in the pulse frequency modulation mode in response to detecting that a magnitude of the error signal is above a first threshold value; and switching from operating the control circuitry in the pulse frequency modulation mode to operating the control circuitry in the pulse width modulation mode in response to detecting that the magnitude of the error signal is below a second threshold value.

14. A method comprising:

via control circuitry in a power supply:
  receiving an error signal, the error signal indicating a difference between an output voltage of the power supply and a desired setpoint for the output voltage; and
  depending on the error signal, switching between:
    operating the control circuitry in a pulse width modulation mode to produce the output voltage,
    operating the control circuitry in a pulse frequency modulation mode to produce the output voltage;
  wherein operating the control circuitry in the pulse width modulation mode to produce the output voltage includes utilizing a P-component, an I-component, and a D-component in a filtered path of a control loop of the control circuitry to implement the pulse width modulation mode, the filtered path including filter circuitry incurring a signal delay; and
  wherein operating the control circuitry in the pulse frequency modulation mode to produce the output voltage includes utilizing the I-component in the filtered path of the control loop and utilizing a P-component and a D-component in a non-filtered path of the control loop to implement the pulse frequency modulation mode, the non-filtered path incurring a signal delay of less than half the signal delay caused by the filter circuitry in the filtered path.

15. The method as in claim 14, wherein operating the control circuitry in the pulse frequency modulation mode further comprises:

inputting a sum of the P-component and a D-component in the non-filtered path to a linearization circuit in the non-filtered path, the linearization circuit configured to linearize the sum; and controlling a switching period of a control signal produced by the control circuitry based at least in part on an output of the linearization circuit.

16. A power supply system comprising:

a monitor circuit configured to receive an error signal, the error signal indicating a difference between an output voltage of the power supply and a desired setpoint for the output voltage;

control circuitry configured to switch between operating the control circuitry in a pulse width modulation mode to produce the output voltage and operating the control circuitry in a pulse frequency modulation mode to produce the output voltage depending on the error signal;

wherein the monitor circuit is configured to monitor the error signal to detect a transient condition;

wherein the control circuitry is configured to utilize a P-component, and I-component, and a D-component in a first circuit path of the control circuitry to operate in the pulse width modulation mode; and wherein the control circuitry, in response to the transient condition, is configured to:
  utilize the I-component in the first circuit path of the control loop to control a pulse width of a control signal generated by the control circuitry, discontinue use of the P-component and D-component in the first circuit path to control the pulse width, and utilize a P-component and D-component in a second circuit path of the control loop in conjunction with the I-component in the first circuit path of the control loop to operate in the pulse frequency modulation mode.

17. The power supply system as in claim 16, wherein the control circuitry includes:

the first circuit path to control a pulse width of the control signal to produce the output voltage;

the second circuit path to control a period setting of the phase control signal to produce the output voltage;

wherein the first circuit path is configured to generate pulse width setting information based on the error signal, the first circuit path including filter circuitry delaying generation of the pulse width setting information; and wherein the second circuit path is configured to generate period setting information based on the error signal, the second circuit path lacking filter circuitry to provide a substantially faster response than the first circuit path.

18. The power supply system as in claim 16, wherein the monitor circuit is configured to:

analyze a magnitude and a slope of the error signal; and initiate switchover from the pulse width modulation mode to the pulse frequency modulation mode in response to detecting the transient load condition during which: i) the magnitude of the error signal falls outside an acceptable magnitude range and ii) the slope of the error signal falls outside of an acceptable slope range.

19. The power supply system as in claim 16, wherein the monitor circuit is configured to initiate deactivation of at least one phase in the power supply to prevent an overshoot on the output voltage in response to detecting that a magnitude of the error signal is above a threshold value.

20. A power supply system comprising:

a monitor circuit configured to receive an error signal, the error signal indicating a difference between an output voltage of the power supply and a desired setpoint for the output voltage;

control circuitry configured to switch between operating the control circuitry in a pulse width modulation mode to produce the output voltage and operating the control circuitry in a pulse frequency modulation mode to produce the output voltage depending on the error signal;

wherein the monitor circuit is configured to switch from operating the control circuitry in the pulse width modulation mode to the pulse frequency modulation mode in response to detecting a transient condition based on a change in the error signal; and wherein the control circuitry includes a signal shaping function to provide a non-linear control response to the transient condition until a slope of error signal reduces to a value below a threshold value.

21. A power supply system comprising:

a monitor circuit configured to receive an error signal, the error signal indicating a difference between an output voltage of the power supply and a desired setpoint for the output voltage;

control circuitry configured to switch between operating the control circuitry in a pulse width modulation mode to produce the output voltage and operating the control circuitry in a pulse frequency modulation mode to produce the output voltage depending on the error signal;

wherein the control circuitry is configured to produce the output voltage utilizing a P-component, an I-component, and a D-component in a filtered path of a control loop of the control circuitry, the filtered path including filter circuitry incurring a signal delay; and wherein the control circuitry is configured to utilize the I-component in the filtered path of the control loop and utilizing a P-component and a D-component in a non-filtered path of the control loop of the control circuitry to implement the pulse frequency modulation mode, the non-filtered path incurring a signal delay of less than half the signal delay caused by the filter circuitry in the filtered path.

22. The power supply system as in claim 21, wherein the non-filtered path includes a linearization circuit configured to receive a sum of the P-component and a D-component in the non-filtered path, the linearization circuit configured to linearize the sum of the P-component and a D-component in the non-filtered path, the control circuitry further comprising:

a PWM signal generator configured to control a switching period of a phase control signal based at least in part on an output of the linearization circuit.

* * * * *